United States Patent [19]
Bosley

[11] Patent Number: 5,368,070
[45] Date of Patent: Nov. 29, 1994

[54] RADIAL SEAL FLUID COUPLERS

[75] Inventor: Kevin J. Bosley, Aberdeen, Scotland

[73] Assignee: FSSL Limited, Ellon, Scotland

[21] Appl. No.: 930,599

[22] PCT Filed: Mar. 28, 1991

[86] PCT No.: PCT/GB91/00492

§ 371 Date: Dec. 4, 1992

§ 102(e) Date: Dec. 4, 1992

[87] PCT Pub. No.: WO91/15704

PCT Pub. Date: Oct. 17, 1991

[30] Foreign Application Priority Data

Apr. 4, 1990 [GB] United Kingdom ............ 9007590.4

[51] Int. Cl.$^5$ ............................................. F16L 37/28
[52] U.S. Cl. ..................... 137/614.04; 251/149.1;
277/205; 285/109; 285/379
[58] Field of Search ............ 137/614, 614.01, 614.02,
137/614.03, 614.04, 614.05; 251/149, 149.1,
149.6, 214; 277/189, 205, 102; 285/379, 109

[56] References Cited

U.S. PATENT DOCUMENTS

| | | | |
|---|---|---|---|
| 3,288,472 | 11/1966 | Watkins | 277/205 X |
| 3,581,499 | 6/1971 | Barosko | 277/205 X |
| 4,585,238 | 4/1986 | Nicholson | 277/205 |
| 4,586,537 | 5/1986 | Takahashi | 137/614 X |
| 4,694,859 | 9/1987 | Smith, III | 137/614.04 |
| 4,709,726 | 12/1987 | Fitzgibbons | 137/614.04 |
| 4,768,538 | 9/1988 | Mintz et al. | 137/15 |
| 4,834,139 | 5/1989 | Fitzgibbons | 137/614.04 |

Primary Examiner—Martin P. Schwadron
Assistant Examiner—Kevin L. Lee
Attorney, Agent, or Firm—Iandiorio & Teska

[57] ABSTRACT

According to a further aspect of the present invention there is provided a coupling comprising a male coupler and a female coupler including means for allowing transmission of fluid pressure between the couplers on the mating of the couplers, a first annular seal positioned in a recess in the body of the female coupler to provide a seal between the male and female couplers and extending around the periphery of the male coupler, an outer retainer engageable with the body of the female coupler, and inner retaining means supported by the outer retainer to maintain the first seal in position on withdrawal of the male coupler from the female coupler, the outer retainer accommodating a second annular seal which seals against and around the periphery of the male coupler, and the inner retaining means serving to keep the second seal in position.

12 Claims, 3 Drawing Sheets

RADIAL SEAL FLUID COUPLERS

COMMENTARY ON PRIOR ART

French specification No. 1036551 (of which a translation is not available and of which there is no known equivalent) describes a domestic water pipe coupling. It is not intended for high pressure, subsea use and contains no self-sealing valves. It is not intended to provide a make and break coupling composed of male and female couplers. It shows a pipe which fits loosely inside a T-piece with a seal between the pipe and the T-piece maintained in position by an intermediate pipe section 7.

U.S. Pat. No. 4,637,470 is the first known patent which concerns subsea couplers and which includes a metal to metal seal. The seal is a V-section ring 55 illustrated in FIG. 2. This form of seal is intended to provide an axial seal between the axial end face of the male coupler and an axial face of the female coupler. It corresponds to neither of the principal seals employed in the applicants coupler and has the particular disadvantage that the seal can be damaged if the insertion force is too great and the further disadvantage that when the couplers are disengaged, the V-seal can be lost.

British specification No. 2183310 is the British equivalent of U.S. Pat. No. 4,694,859 referred to on page 2 of the application. The patent describes the use of a C-section annular metal seal 23 which forms a radial seal between the female coupler and the periphery of the male coupler when the two couplers are mated and their poppet valves mutually open to allow fluid flow between the couplers. The C-section seal is kept in place in a recess in the body of the female by a retainer 28 that fits into the bore of the female and is itself maintained in position by a spring clip 29.

The seal 23 in GB-2183310 fulfils a purpose similar to that of the seal 31 in the preferred embodiment described in the present application. GB-2183310 describes a further, O-ring seal 30 which is disposed in a recess in the retainer aforementioned and which can engage the periphery of the male coupler as the latter is mated with the other coupler. This type of O-ring can be displaced by either vacuum suction or the inrush of water when the male coupler is disengaged from the female coupler, as specifically discussed on page 2 of the instant application. The applicants improved seal and retaining means for it provide significant improvement over the seal system described in GB-2183310.

U.S. Pat. No. 4,709,726 shows a subsea coupler with male and female parts of a configuration broadly the same as GB-2183310. In the coupler described in U.S. Pat. No. 4,709,726, the radial C-section metal seal is not retained in a recess in the body of the female coupler but is instead located in a floating ring 102 either at the inner periphery of this ring or the outer periphery of the ring. In the former of these positions the C-section seal can engage the male coupler peripherally but in the second of the two positions the C-seal is actually disposed between the floating ring and the external sleeve 80 and does not provide a seal for the male coupler.

In this coupler there is an additional backup O-ring seal 90 which is disposed in a recess in the sleeve 80. This O-ring seal has the same disadvantages as that provided in GB-2183310.

U.S. Pat. No. 4,768,538 describes a subsea hydraulic coupler of the same general character as those shown in U.S. Pat. No. 4,709,726 and GB-2183310. As is best seen in FIG. 4, the seal system comprises a metal C-section annular 'radial' seal 78, which fulfils the same general purpose as the similarly shaped seal in GB-2183310. Also, like the coupler shown in GB-2183310, the outer retaining sleeve supports an elastomeric O-ring 90 which can provide a radial seal around the periphery of the male coupler.

DESCRIPTION OF A SPECIFIC EXAMPLE OF THE INVENTION

Figure 1:
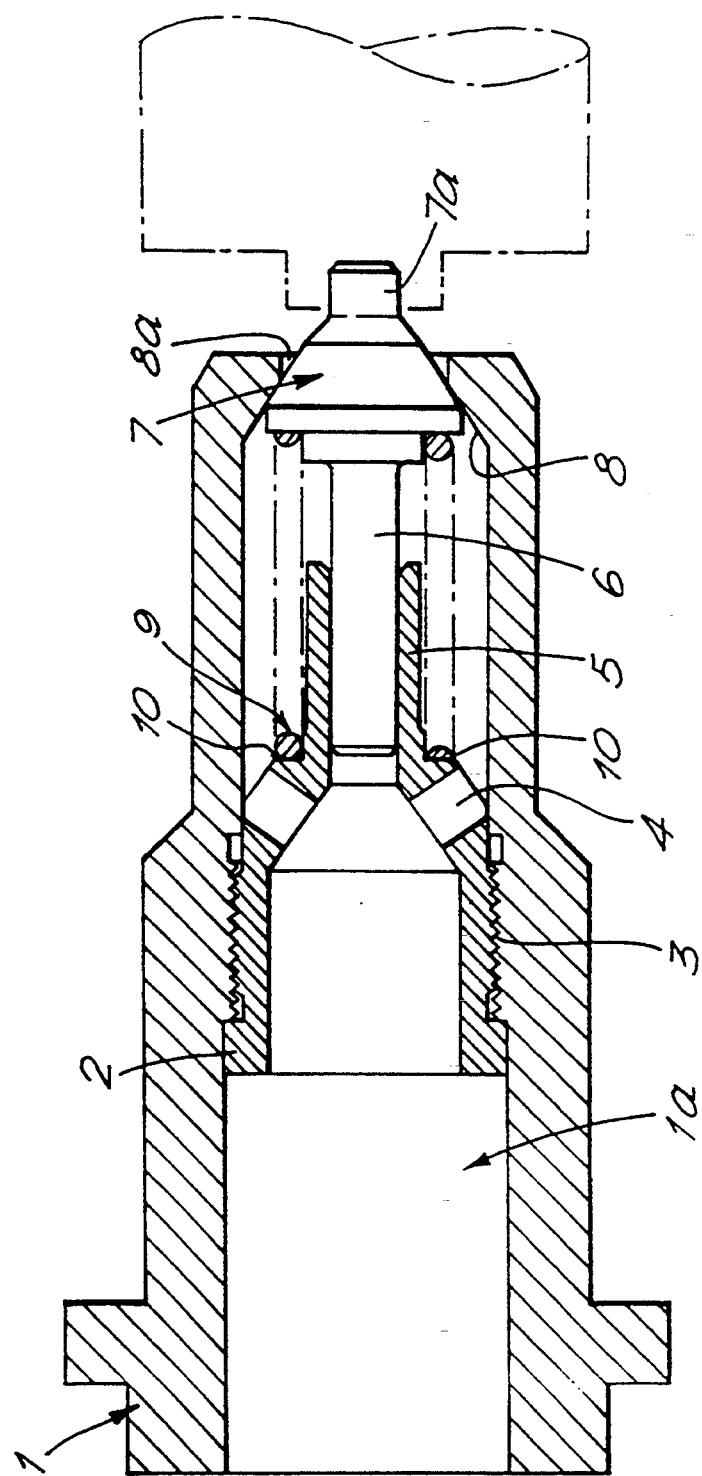
FIG. 1 is a sectional view of an embodiment of a male coupler (or "probe") according to the present invention.
Figure 2:
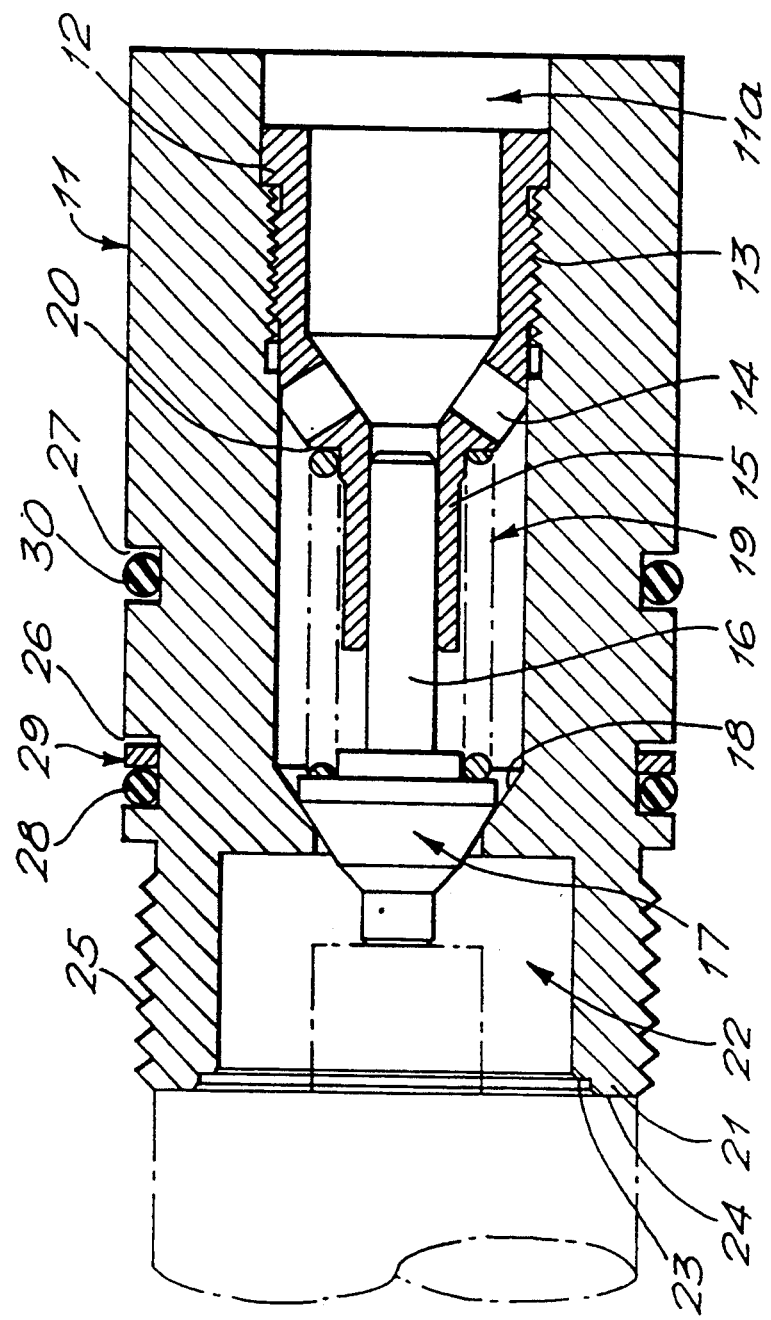
FIG. 2 is a sectional view of an embodiment of a female coupler (or "receiver") according to the present invention.

The male coupler shown in FIG. 1 and the female coupler shown in FIG. 2 may be axially aligned in a conventional manner for mated engagement to form a coupling according to the present invention. In a typical application, couplings, each comprising male and female couplers, and each interconnected with respective fluid lines, are provided in female and male umbilical junction plates of a monitoring and/or control system of a hydrocarbon recovery system. In another application, the male couplers can each be mounted in a subsea control module mounting base, while the female couplers are each similarly mounted in the interface flange of a control module. When mated, the couplers interconnect respective fluid lines without loss of the fluid or of the fluid pressure which is being transmitted through the lines, while each coupling also seals the exterior subsea environment from the transmitted fluids. Mating and unmating of the couplings results in little, if any, loss of transmitted fluid to the environment, and the subsea mounting bases may be coupled and uncoupled numerous times during the life of the subsea operation.

Referring first to FIG. 1, the male coupler has a cylindrical metal body 1 with an internal bore 1a in which there is a cylindrical insert 2 having a screw fitting 3 to the inside of the bore. The insert 2 has apertures 4 for allowing fluid flow and a forward tubular extension 5 which receives the stem 6 of a poppet valve 7. This valve is urged against a conical seat 8 at the forward end of the male coupler by means of a compression spring 9 between the head of the valve and a shoulder 10 on the insert 2. Fluid flow into or out of the forward end of the male coupler by way of the aperture 8a in the seat 8 is permitted when the tip 7a of the poppet valve 7 is depressed by its engagement with the tip of a similar valve in the female receiver and is thereby caused to move away from the seat. The coupler is self-sealing, in that when the male and female couplers are disengaged, the valve 7 returns to close the aperture 8a.

The female coupler as shown in FIG. 2 has a metal body 11 which has an internal bore 11a in which there is an insert 12 similar to the insert 2 for the male coupler. This insert has a screw fitting 13 to the inside of the bore 11a, apertures 14 and a forward extension 15 similar to apertures 4 and extension 5, and the extension receives a stem 16 of a poppet valve 17 urged against a conical seat 18 by means of spring 19 between the head of the valve and a shoulder 20 on the insert 12, all as described relative to the male coupler. When the coupling is fully mated, the internal bore 1a of the male coupler is axially aligned with the internal bore 11a of the female coupler.

The female coupler has at its forward end a cylindrical part 21 which defines a receiving socket 22 for the male coupler. At the end of the female coupler, in the end face 24 of the part 21, is an annular recess 23 defining a shoulder and which supports an annular seal: in FIG. 3 this annular seal is shown as a seal 31. The seal is preferably a metal seal which is responsive to fluid pressure within the coupling to expand radially against the male coupler. The seal 31 maybe a C-section seal which expands both inwardly against the male coupler and outwardly against the female coupler.

Figure 3:
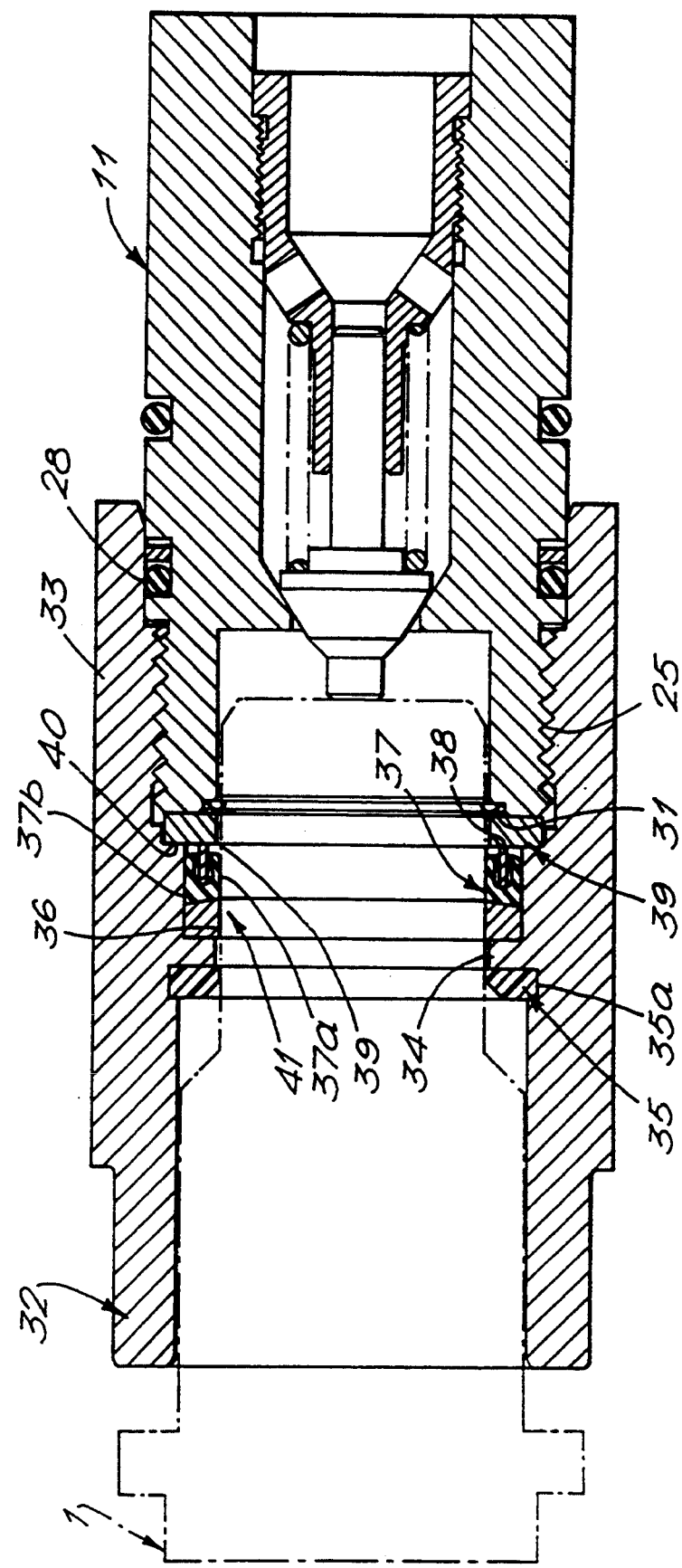
FIG. 3 is a sectional view of the female coupler as shown in FIG. 2, an external retainer sleeve, an internal retaining ring and various seals; the male coupler is shown in ghost, almost fully inserted.

On the outside of the cylindrical part 21 is a screw threading 25, which co-operates with a sleeve 32 as shown in FIG. 3.

The outer surface of the body 11 of the female coupler includes two circumferential grooves 26 and 27. In the groove 26 are an elastomeric O-ring 28 and a packing ring 29, and in the groove 27 is an elastomeric O-ring 30, intended for improving the seal between the female coupler and its fluid line (not shown).

FIG. 3 shows the female coupler 11 and the outer retainer 33 including sleeve 32 which has a screw threading engaging the threading 25, the sleeve being fitted such that it is coaxial with the female coupler. The elastomeric O-ring 28 engages the inner periphery of the sleeve 32 near one end thereof to provide a seal between the female coupler and the sleeve and prevent leakage from the interior of the coupling through the screw threads 25 into the outside environment.

On the inside of the sleeve 32 is an internal radial flange 34 which supports an annular bushing 35 which is of a resilient polymeric material such as PTFE and has a slightly smaller inside diameter than the flange 34. The bushing seats in an annular groove 35a adjacent the flange 34. The purpose of the alignment bushing is to guide the male coupling during insertion and withdrawal.

Forward of the flange 34 is a packing ring 36. Adjacent this ring is an annular elastomeric or reinforced elastomeric seal (such as an Omniseal) 37 which has a hollow section such as a C-section. This seal has an inside surface 37a which seals against the periphery of the male coupler, and an outside surface 37b which seals against the bore of the sleeve 32.

The hollow section annular seal 37 is pressure responsive, and can thereby expand radially in response to fluid pressure within the coupling. The seal 37 is intended to be capable of withstanding the high fluid line pressures should the seal 31 fail. The coupling is thus rendered less susceptible to failure and can more reliably withstand high pressure pulsations.

The seal 37 is kept in place by a thin cylindrical ring 38 which extends into the annular cavity of the seal 37. The ring is preferably a loose fit between the seal 37 and a metal ring 39 which bears against the end surface 24 of the female coupler when the sleeve is screwed on to the outside of the female. The ring 39 is supported in an internal annular shoulder 40 in the sleeve 32.

The ring 39 partly extends over the C-ring metal seal 31 to help retain this seal in place. The sleeve is screwed onto the female coupler so as to press the ring 39 firmly against the end of the female coupler. The ring 39 also defines with the sleeve, and in particular the flange 34 thereof, a recess 41 for the accommodation of the seal 37, and enables the seal 37 to be inserted before the female coupler is assembled.

It is a feature of the present coupling that sealing integrity between the mated male and female couplers is provided by a pressure responsive primary seal, preferably provided by metal seal 31 and a pressure responsive secondary seal, provided by annular seal 37, both of which seals engage the same diameter cylindrical surface of the male body. The arrangement of seals as shown in FIG. 3 ensures that a "fluid lock" situation cannot develop as the coupling halves are mated and/or unmated, which situation may occur if the seal 31 is adapted for sealing on a smaller diameter cylindrical surface of the male body than the surface of the male body adapted for sealing with seal 37. Moreover, the seal 37 is trapped in place and cannot be dislodged when the male and female couplers are disengaged. Another advantage of the design is that the retaining means acts as a retainer for both the seals 31 and 37.

I claim:

1. A coupling comprising a male coupler (1) and a female coupler (11) including means (7,17) for allowing transmission of fluid pressure between the couplers on the mating of the couplers, a first annular hollow-section seal (31) positioned in a recess in the body of the female coupler and responsive to said fluid pressure to provide a seal between the male and female couplers and extending around the periphery of the male coupler, an outer retainer (33) engageable with the body of the female coupler, and inner retaining means (38,39) supported by the outer retainer to maintain said first annular seal (31) in position on withdrawal of the male coupler from the female coupler, the outer retainer accommodating a second annular hollow-section pressure-responsive seal (37) which is capable of responding to said fluid pressure to sealingly engage against and around the periphery of the male coupler, and the inner retaining means serving to keep said second annular seal in position.

2. A coupling according to claim 1 in which the outer retainer (33) comprises a sleeve for engagement externally of the female coupler and the inner retaining means includes a ring (39) which is separate from the sleeve.

3. A coupling according to claim 1 in which said second annular seal (37) is a hollow-section seal.

4. A coupling comprising a male coupler (1) and a female coupler (11) including means (7, 17) for allowing transmission of fluid pressure between the couplers on the mating of the couplers, a first annular seal (31) positioned and responsive to said fluid pressure to provide a radial seal between the male and female couplers, and retaining means for maintaining said first annular seal in position on withdrawal of the male coupler from the female coupler, the retaining means including a sleeve 32 for engagement externally of the female coupler, said sleeve having an internal shoulder, wherein the coupling further comprises an inner retaining ring (39) disposed between the sleeve and the female coupler, said ring being supported by said internal shoulder and extending inwardly partly over the said first annular seal (31), the inner retaining ring (39) defining with said sleeve an annular recess (41), a second annular, hollow-section, seal (37) disposed within the said recess and capable of responding to said fluid pressure to engage sealingly the periphery of the male coupler, and means (38) supported by the inner retaining ring for inhibiting movement of said second annular seal from the said recess.

5. A coupling according to claim 4 wherein said second annular seal (37) includes an outside surface (37b) which seals against sleeve 33 and an inside surface 37a which seals against the male coupler (1).

6. A coupling according to claim 5 wherein said second annular seal is an elastomeric seal.

7. A coupling according to claim 4 wherein said coupling further comprises a packing ring (36), said packing ring being disposed within said annular recess and against the second seal (37).

8. A coupling according to claim 4, further comprising at least one annular seal (28) between the sleeve (33) and the female coupler (11).

9. A coupling according to claim 4 additionally comprising a resilient alignment guide (35) seated inside said sleeve.

10. A coupling comprising:
a male coupler and a female coupler including means for allowing transmission of fluid pressure therebetween on the meeting of the male coupler and female coupler;
a first annular seal positioned to provide a radial seal between said male coupler and said female coupler in response to said fluid pressure;
outer retaining means for maintaining said first annular seal in position on withdrawal of said male coupler from said female coupler, said outer retaining means comprising a sleeve for engagement externally of said female coupler;
inner retaining means disposed between said sleeve and said female coupler and extending inwardly partly over said first annular seal, said inner retaining means defining with said sleeve an annular recess;
a second hollow-section, elastomeric, annular seal having an annular cavity and being disposed within said recess, said second seal being capable of responding to said fluid pressure to sealingly engage the periphery of said male coupler; and
means, supported by said inner retaining means, for inhibiting movement of said second, hollow-section, elastomeric, annular seal from said recess, said means for inhibiting comprising an annular metal ring extending into said annular cavity.

11. A coupling comprising:
a male coupler and a female coupler including means for allowing transmission of fluid pressure therebetween on the mating of said male coupler and said female coupler;
a first annular seal member positioned in a recess in the body of said female coupler and responsive to said fluid pressure to provide a seal between said male coupler and said female coupler and extending around the periphery of said male coupler;
an outer retaining engageable with the body of said female coupler;
inner retaining means supported by said outer retainer to maintain said first annular seal in position on withdrawal of said male coupler from said female coupler; and
a second, annular, hollow section seal which is capable of responding to said fluid pressure to provide a radial seal against and around the periphery of said male coupler, wherein said outer retainer accommodates said second annular, hollow section seal and said inner retaining means supports means extending into the interior of the hollow section of said second annular, hollow-section seal, said inner retaining means thereby serving to keep said second annular, hollow-section seal in position.

12. The coupling according to claim 11 in which said outer retainer comprises a sleeve for engagement externally of said female coupler and said inner retaining means includes a ring which is separate from said sleeve.

* * * * *

UNITED STATES PATENT AND TRADEMARK OFFICE
CERTIFICATE OF CORRECTION

PATENT NO. : 5,368,070
DATED : November 29, 1994
INVENTOR(S) : Kevin J. Bosley

It is certified that error appears in the above-indentified patent and that said Letters Patent is hereby corrected as shown below:

Please delete Col. 1, line 3 - Col. 2, line 6.

Please insert in its place in Col. 1, line 1, after "Radial Seal Fluid Couplers" the attached pages.

UNITED STATES PATENT AND TRADEMARK OFFICE
CERTIFICATE OF CORRECTION

PATENT NO. : 5,368,070
DATED : November 29, 1994
INVENTOR(S) : Kevin J. Bosley

It is certified that error appears in the above-indentified patent and that said Letters Patent is hereby corrected as shown below:

RADIAL SEAL FLUID COUPLERS

Background to the Invention

The present invention relates to a fluid coupling with radial sealing between male and female couplers and, more particularly, to a fluid coupling suitable for satisfactory performance even after repeated mating and unmating operations.

Male and female mating couplers have been used to sealingly join pressurized fluid lines, for example in subsea hydraulic couplings. Such couplings usually comprise a bore in each of the male and female couplers, the bores being aligned on mating of the couplers. When the couplers are unmated, a biassed poppet valve in the body of each coupler seals the end of the respective coupler. When the couplers are mated, the two poppet valves engage one with the other and are lifted off their respective valve seats, so that fluid pressure can be transmitted through the coupling.

UNITED STATES PATENT AND TRADEMARK OFFICE
CERTIFICATE OF CORRECTION

PATENT NO. : 5,368,070
DATED : November 29, 1994
INVENTOR(S) : Kevin J. Bosley

It is certified that error appears in the above-indentified patent and that said Letters Patent is hereby corrected as shown below:

Since the fluid pressures can be very high, it is necessary to provide a means to prevent leakage from the interior of the coupling, and in particular from the region of the poppet valves. For this purpose it has been proposed to employ a ring seal which provides a metal-to-metal seal between the male and female couplers. The seal may have a C-section or other section which enables the seal to expand radially in response to fluid pressure to improve its sealing action; there may be an auxiliary elastomeric seal to safeguard against failure of the metal seal.

Known couplers are exemplified by USA patents Nos. 3918485, 4637470, 4694859, 4834139 and 4768538, and British patent No. 2201212.

UNITED STATES PATENT AND TRADEMARK OFFICE
CERTIFICATE OF CORRECTION

PATENT NO. : 5,368,070
DATED : November 29, 1994
INVENTOR(S) : Kevin J. Bosley

It is certified that error appears in the above-indentified patent and that said Letters Patent is hereby corrected as shown below:

Current designs for couplers are, however, frequently unreliable. Retainers for the seals are susceptible to blowout under high pressure pulsations. The sealing length between the male and female coupling halves is relatively long and, accordingly, intolerant of axial misalignment. Designs with V-shaped axial seals, such as shown in US-A-4637470 require pre-load mechanisms to prevent separation of the couplers and are liable to loss of the seal when the couplers are disengaged. A radial metal seal may be damaged or scratched, for example, on insertion of the male coupling half, and its sealing reliability may consequently be impaired. Even the male coupling half may be damaged on insertion. Additionally, the partial vacuum caused by disconnecting the coupling halves may cause any elastomeric seal to be sucked out of its position in the bore of the female half.

UNITED STATES PATENT AND TRADEMARK OFFICE
CERTIFICATE OF CORRECTION

PATENT NO. : 5,368,070
DATED : November 29, 1994
INVENTOR(S) : Kevin J. Bosley

It is certified that error appears in the above-indentified patent and that said Letters Patent is hereby corrected as shown below:

Summary of the Invention

It is therefore an object of the invention to provide an improved fluid coupler.

According to one aspect of the present invention there is provided a coupling comprising a male coupler and a female coupler including means for allowing transmission of fluid pressure between the couplers on the mating of the couplers, a first annular seal positioned to provide a radial seal between the male and female couplers, and retaining means for maintaining the first seal in position on withdrawal of the male coupler from the female coupler, the retaining means including a sleeve for engagement externally of the female coupler, wherein the coupling further comprises an inner retaining means disposed between the sleeve and the female coupler and extending inwardly partly over the said

UNITED STATES PATENT AND TRADEMARK OFFICE
CERTIFICATE OF CORRECTION

PATENT NO. : 5,368,070
DATED : November 29, 1994
INVENTOR(S) : Kevin J. Bosley

It is certified that error appears in the above-indentified patent and that said Letters Patent is hereby corrected as shown below:

first seal, the inner retaining means defining with said sleeve an annular recess, a second annular seal disposed within the recess to engage sealingly the periphery of the male coupler, and means supported by the inner retaining means for inhibiting movement of the second seal from the recess.

According to a further aspect of the present invention there is provided a coupling comprising a male coupler and a female coupler including means for allowing transmission of fluid pressure between the couplers on the mating of the couplers, a first annular seal positioned in a recess in the body of the female coupler to provide a seal between the male and female couplers and extending around the periphery of the male coupler, an outer retainer engageable with the

UNITED STATES PATENT AND TRADEMARK OFFICE
CERTIFICATE OF CORRECTION

PATENT NO. : 5,368,070
DATED : November 29, 1994
INVENTOR(S) : Kevin J. Bosley

It is certified that error appears in the above-indentified patent and that said Letters Patent is hereby corrected as shown below:

body of the female coupler, and inner retaining means supported by the outer retainer to maintain the first seal in position on withdrawal of the male coupler from the female coupler, the outer retainer accommodating a second annular seal which seals against and around the periphery of the the male coupler, and the inner retaining means serving to keep the second seal in position.

Signed and Sealed this

Twentieth Day of June, 1995

Attest:

BRUCE LEHMAN

Attesting Officer

Commissioner of Patents and Trademarks